May 5, 1931. G. SICKLER 1,804,282
SNOWPLOW
Filed July 6, 1929 2 Sheets-Sheet 1
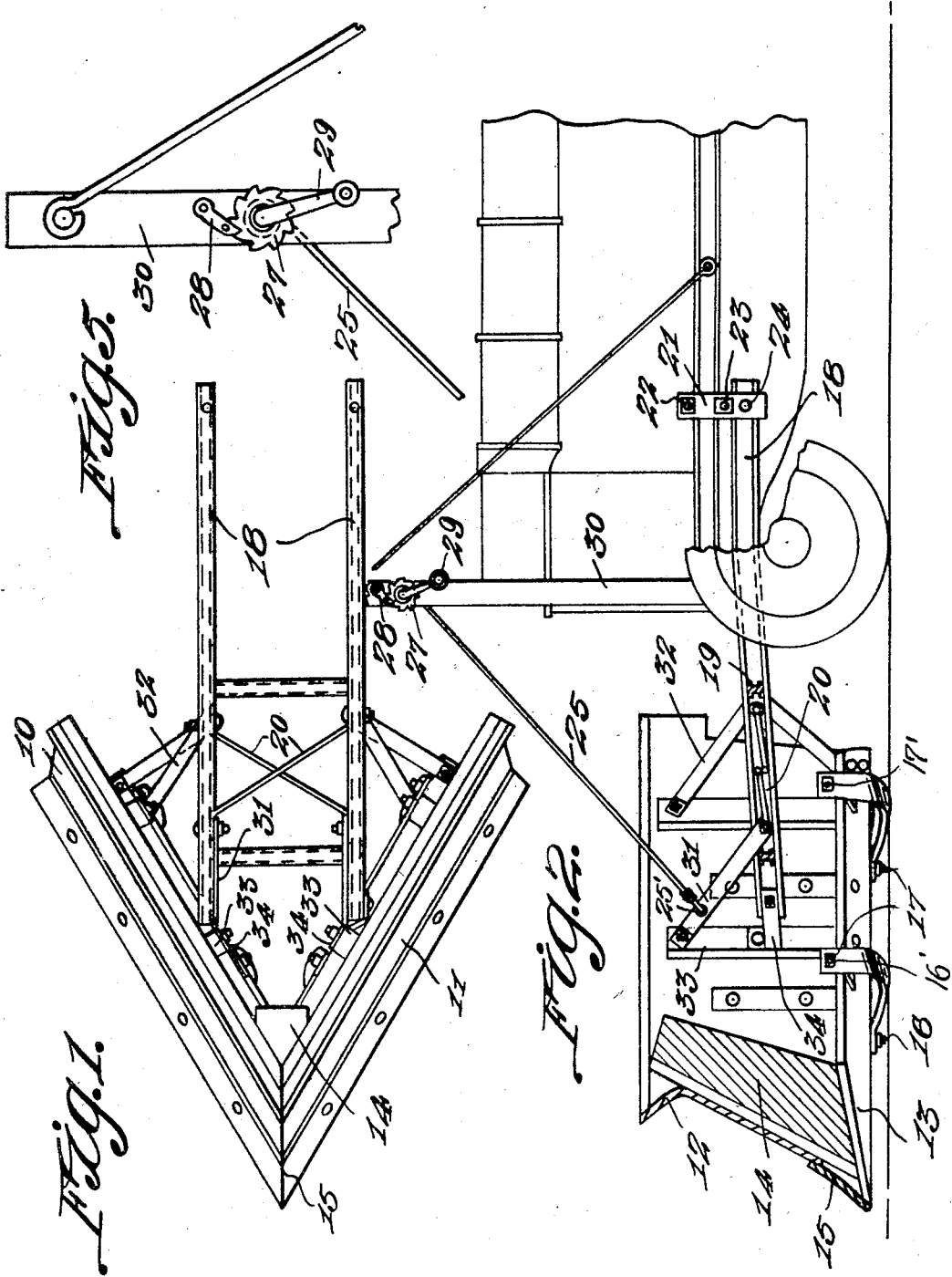
Gilbert Sickler, INVENTOR
BY Victor J. Evans, ATTORNEY

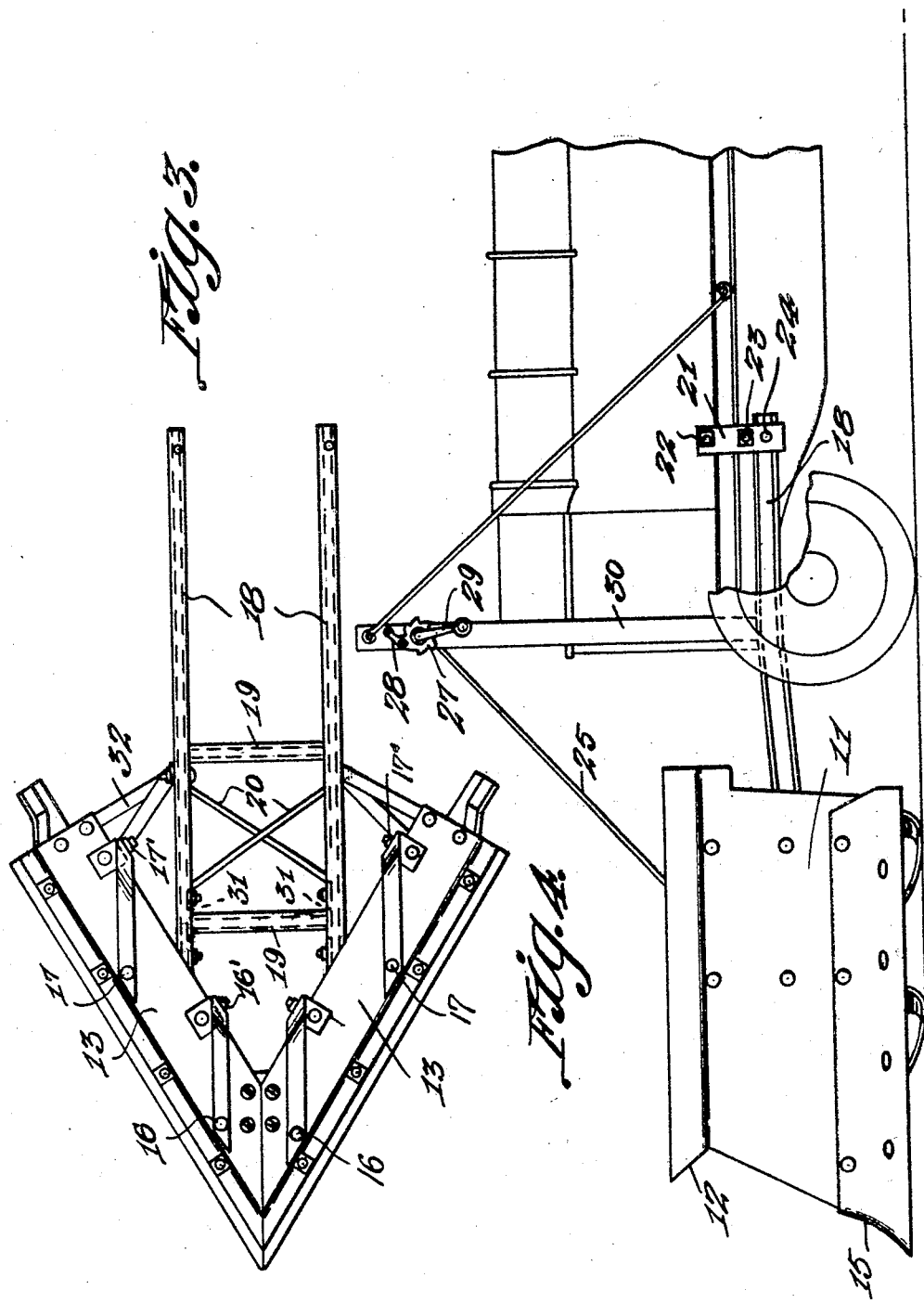

Patented May 5, 1931

1,804,282

UNITED STATES PATENT OFFICE

GILBERT SICKLER, OF ASSARIA, KANSAS

SNOWPLOW

Application filed July 6, 1929. Serial No. 376,307.

The object of this invention is to provide a plow especially adapted for connection with a tractor or the like, and including the usual converging elements, and particular means for mounting these elements with reference to the frame of the tractor together with means for varying the elevation of the plow with reference to a frame mounted in an upright position at the forward portion of the tractor.

With the foregoing and other objects in view, the invention consists in the novel construction and arrangement of elements disclosed, it being understood that modifications may be made within the scope of the claim without departing from the spirit of the invention.

In the drawings forming part of this application:—

Figure 1 is a top plan view of the plow.

Figure 2 is a view in vertical longitudinal section, and showing conventionally a portion of a tractor to which the plow is connected.

Figure 3 is a bottom plan view of the plow.

Figure 4 is a view in side elevation showing the plow and especially illustrating its connection with the forward portion of the tractor.

Figure 5 is a detail view.

The plow comprises the side elements 10 and 11 which may have upper outwardly extending portions 12, and lower flange plates 13, extending from beneath the forward block 14, and upwardly as shown at 15, thus forming the equivalent of blades.

Runners are secured at points such as 16 and 17, and are further secured at 16′ and 17′, deflected portions being provided for this purpose.

The main frame which may be of I beam construction includes the side members 18 and transverse bars 19, and also includes bracing elements such as 20. This frame is to be connected with the main frame elements of the tractor by means of a clevis on each side, or by means of a similar device, and in the drawings I have shown a plurality of plate elements such as 21 secured by means of bolts, at 22, 23 and 24. These elements 21 extend in a vertical direction as shown, and the rear end of the I beam frame may be firmly secured in this manner, whereas the elevation of the frame may be determined by means of flexible devices such as 25 adapted to be wound around a rotated element 26, the axle of which carries the ratchet wheel 27 engaged by a pawl 28, the axle and ratchet wheel being rotated by a crank 29. This axle is to be supported by means of a frame including side elements 30 mounted as shown. The forward ends of the elements 25 are connected at any suitable point such as 25′, and it should be added that braces 31 and 32 are employed on each side and are connected with vertical strips such as 33 secured to the elements 10 and 11.

The braces are further connected with the elements 18 of the I beam frame. The forward ends of the elements 18 are connected with strips 33 on the converging elements 10 and 11, by means of braces or the like shown at 34.

It will be observed that the structure of the plow is effectively braced laterally and that the position of the I beam frame and the elements thereof is such with reference to the frame of the tractor that direct forward thrust is imparted, rendering the power exerted by the tractor effective against the relative high resistance offered by drifted snow, or snow and ice.

What is claimed is:—

A plow comprising a pair of side elements connected at their forward ends and diverging towards their rear ends and having the upper edges inclined outwardly and upwardly, a block at the connected ends of said side elements, lower flange plates at the lower edges of said elements and extending from beneath the block and upwardly and secured to the side elements to form blades, curved runners secured to said plates, vertical braces between said side elements and the plates, and a tractor connecting means secured to said braces.

In testimony whereof I affix my signature.

GILBERT SICKLER.